US008534698B2

(12) United States Patent
Dotsey (10) Patent No.: US 8,534,698 B2
(45) Date of Patent: Sep. 17, 2013

(54) FOLD LATCH FOR A FOLDABLE STROLLER (75) Inventor: Michael A. Dotsey, Pottstown, PA (US)

(73) Assignee: Graco Children's Products Inc., Atlanta, GA (US)

( * ) Notice: Subject to any disclaimer, the term of this patent is extended or adjusted under 35 U.S.C. 154(b) by 612 days.

(21) Appl. No.: 12/551,325

(22) Filed: Aug. 31, 2009

(65) Prior Publication Data

US 2010/0219616 A1 Sep. 2, 2010

Related U.S. Application Data (60) Provisional application No. 61/156,413, filed on Feb. 27, 2009.

(51) Int. Cl.
*B62B 7/08* (2006.01)

(52) U.S. Cl.
USPC .......................................... 280/642; 280/647

(58) Field of Classification Search
USPC ................... 280/639, 641, 642, 42, 647, 650, 280/658, 47.25, 47.38
See application file for complete search history.

(56) References Cited

U.S. PATENT DOCUMENTS

| 4,415,180 | A | * | 11/1983 | Payne, Jr. | 280/650 |
| 4,428,598 | A | * | 1/1984 | Kassai | 280/644 |
| 4,529,219 | A | * | 7/1985 | Shamie | 280/642 |
| 4,846,494 | A | * | 7/1989 | Kassai | 280/642 |
| 5,454,584 | A | * | 10/1995 | Haut et al. | 280/642 |
| 5,755,455 | A | * | 5/1998 | Chen et al. | 280/642 |
| 5,882,030 | A | * | 3/1999 | Haut | 280/642 |
| 8,061,732 | B2 | * | 11/2011 | Song et al. | 280/650 |
| 8,191,919 | B2 | * | 6/2012 | Wang | 280/649 |
| 2002/0017769 | A1 | * | 2/2002 | Worth et al. | 280/300 |
| 2004/0222607 | A1 | * | 11/2004 | Myers | 280/47.38 |
| 2006/0131840 | A1 | * | 6/2006 | Donay | 280/642 |
| 2006/0255564 | A1 | * | 11/2006 | Ayre | 280/642 |
| 2007/0296182 | A1 | * | 12/2007 | Saville et al. | 280/642 |
| 2008/0168603 | A1 | | 7/2008 | Ayette et al. | |
| 2008/0191451 | A1 | | 8/2008 | Driessen | |
| 2008/0315562 | A1 | | 12/2008 | Song et al. | |

FOREIGN PATENT DOCUMENTS

| EP | 1 503 095 | | 2/2005 |
| EP | 1 614 605 | * | 1/2006 |
| EP | 2 011 717 | | 1/2009 |
| GB | 2 443 070 | | 4/2008 |

OTHER PUBLICATIONS

International Search Report and Written Opinion from corresponding International application No. PCT/US2010/025318 mailed Jul. 1, 2010.

* cited by examiner

*Primary Examiner* — Paul N Dickson
*Assistant Examiner* — Bridget Avery
(74) *Attorney, Agent, or Firm* — Lempia Summerfield Katz LLC (57) ABSTRACT

A foldable stroller chassis has left and right sides, a front end, and a rear end. The chassis has a chassis joint between the left and right sides, a front wheel section extending toward the front end, and a rear wheel section extending toward the rear end and coupled to the front wheel section at the chassis joint. The front and rear wheel sections are pivotable away from one another to an in-use configuration and toward one another to a folded configuration. A fold latch mechanism is positioned adjacent the chassis joint between the left and right sides and is reconfigurable between a latched condition securing the chassis in the in-use configuration and an unlatched configuration. A part of the mechanism is carried on the front wheel section and a part of the mechanism is carried on the rear wheel section.

19 Claims, 10 Drawing Sheets

FOLD LATCH FOR A FOLDABLE STROLLER

RELATED APPLICATION DATA

This patent is related to and claims priority benefit of U.S. provisional patent application Ser. No. 61/156,413 entitled "Fold Latch for Foldable Stroller," which was filed on Feb. 27, 2009. The entire content of the above noted application is hereby incorporated by reference.

BACKGROUND

1. Field of the Disclosure

The present disclosure is generally directed to foldable strollers and, more particularly, to a fold latch mechanism for a foldable stroller.

2. Description of Related Art

Most strollers in the marketplace are foldable in some manner and, thus, have some type of fold latch and a latch actuator. The actuator is used to unlatch, unlock, or release the stroller's fold latches to permit the stroller to be reconfigured from an in-use configuration to a folded configuration. A typical stroller frame has a geometry that is created by two parallel frame sides. Each frame side typically has a front leg, a rear leg, and a handle or push bar. The push bars typically are joined at their free ends by a handle. The typical left and right frame sides are also connected by one or more transverse cross-members. Also, most typical folding strollers have legs that are constrained by a linkage that folds along with the rest of the stroller frame.

The frame sides often each have a separate fold latch mechanism that is generally located at a pivot joint connecting frame parts on that frame side. Each latching mechanism is typically connected or couple to at least one, and sometimes more than one fold actuator. Some strollers have a dedicated fold actuator on or near each of the fold latches. Other strollers a lone fold actuator that can operate both fold latches simultaneously. The actuator or actuators are often located somewhat close to the operator, such as on or near the handle. The actuator is operated to unlock the fold latching mechanisms so that the stroller can be folded.

Variations in stroller frame geometry can bring about unique fold latch and latch actuator designs. Standards such as EN1888 can also give rise to specific requirements for stroller design and performance. For example, foldable strollers are required in a number of countries to include a secondary safety lock or latch that must first be released before the fold actuator or actuators can be actuated to release the fold latches.

On many strollers, the fold actuator is positioned on the handle, which can result in a user contacting the fold actuator during normal stroller usage. It is thus possible for a user to inadvertently actuate the fold latch or latches while pushing or maneuvering the stroller. Thus, strollers employ, as noted above, a secondary lock or latch mechanism of some type on the fold actuator, which retains the fold actuator in a latched position to prevent such inadvertent actuation. The secondary safety latch or lock must first be actuated in order to move or release the fold actuator to unlatch the fold latch or latches.

In addition, a folded stroller frame can be awkward and inconvenient to carry. Once folded, the structure, though generally compact, is still rather bulky. If a user grabs one side of the folded frame assembly, the various fold joints may be subjected to undue stress as the user carries the stroller. If a user grabs one end of the folded structure, the structure may unfold, unless a stout storage latch is employed. Also, the folded structure may still be rather lengthy, even when folded, making it difficult to carry from one end unless the user is a taller person.

SUMMARY

In one example according to the invention, a foldable stroller frame assembly can have left and right sides, a front end, and a rear end. The frame assembly can include a chassis joint between the left and right sides, a front wheel section extending toward the front end, and a rear wheel section extending toward the rear end and coupled to the front wheel section at the chassis joint. The front and rear wheel sections can be pivotable away from one another to an in-use configuration and toward one another to a folded configuration. A fold latch mechanism is reconfigurable between a latched condition securing the frame assembly in the in-use configuration and an unlatched configuration. A release handle is movable to reconfigure the fold latch mechanism between the latched and unlatched conditions and a safety catch is movable to unlock the release handle. The fold latch mechanism is positioned on the frame assembly between the left and right sides adjacent the chassis joint.

In one example according to the invention, a chassis joint of the frame assembly can define a fold axis traversing laterally between the left and right sides. Front and rear wheel sections of the frame assembly can pivot relative to one another about the fold axis.

In one example according to the invention, a release handle can be mounted to the fold latch mechanism and can have a grip portion that can be movable over a surface of the fold latch mechanism to reposition the release handle between a latched position and a release position.

In one example according to the invention, a safety catch can be biased to a locked condition holding a release handle of the fold latch mechanism in a latched position. The safety catch can be moved to an unlocked condition freeing the release handle to move to a release position.

In one example according to the invention, a safety catch can be mounted to the fold latch mechanism and can have an actuator that can be movable over a surface of the fold latch mechanism to reposition the safety catch between a locked condition and an unlocked condition.

In one example according to the invention, a release handle can be mounted to the fold latch mechanism and can have a grip portion or paddle that, when a safety catch is in an unlocked condition, can be movable over a surface of the fold latch mechanism to reposition the release handle between a latched position and a release position.

In one example according to the invention, an actuator of a safety catch and a grip portion of a release handle can be spaced relative to one another on the fold latch mechanism so as to permit actuation of both by one hand of a user.

In one example according to the invention, a release handle and a safety catch can both be positioned on a part of the fold latch mechanism.

In one example according to the invention, the fold latch mechanism further can have a latch bar carried by and spaced from one of the front and rear wheel sections between the left and right sides, and can have a latch hook carried on the other of the front and rear wheel sections. The latch hook can be configured to engage the latch bar when the fold latch mechanism is latched and the release handle being actuable to disengage the latch hook.

In one example according to the invention, a foldable stroller chassis can have left and right sides, a front end, and a rear end. The chassis can have a chassis joint between the left and right sides, a front wheel section extending toward the front end, a rear wheel section extending toward the rear end and coupled to the front wheel section at the chassis joint. The front and rear wheel sections can be pivotable away from one another to an in-use configuration and toward one another to a folded configuration. A fold latch mechanism is positioned adjacent the chassis joint between the left and right sides and is reconfigurable between a latched condition securing the chassis in the in-use configuration and an unlatched condition. A part of the fold latch mechanism can be carried on the front wheel section and a part of the fold latch mechanism can be carried on the rear wheel section.

In one example according to the invention, the fold latch mechanism further can have a release handle on the fold latch mechanism that can be movable to reconfigure the fold latch mechanism between the latched and unlatched conditions, and can have a safety catch on the fold latch mechanism that can be movable to unlock the release handle.

In one example according to the invention, the fold latch mechanism further can have a release handle with a grip portion that can be movable on a surface of the fold latch mechanism, and can have a safety catch with an actuator that can be exposed on the fold latch mechanism and that can have a projection protruding from the surface. The projection can block movement of the grip portion when the safety catch is in a locked condition.

In one example according to the invention, the fold latch mechanism further can have a housing mounted to a crossbar on the front leg section, a releasable latch hook within the housing; and a latch bar mounted to and spaced from a crossbar of the rear wheel section. The latch hook can engage the latch bar in a latched condition.

In one example according to the invention, the fold latch mechanism further can have a center plate within a housing, and a pair of latch hooks pivotally mounted to the center plate, one on each side of the center plate.

In one example according to the invention, the fold latch mechanism further can have a housing mounted to a part of the chassis, and a release handle pivotally mounted to an exterior of the housing and having a paddle that can be movable along one surface of the housing.

In one example according to the invention, the fold latch mechanism further can have a safety catch with an actuator on one surface of the housing and a projection protruding through another surface. The projection can be actuable by the actuator to block movement of the paddle in a locked condition.

In one example according to the invention, the fold latch mechanism further can have an actuator that, when actuated, can move a projection from a locked condition to an unlocked condition permitting movement of a paddle of a release handle to reconfigure the fold latch mechanism to the unlatched condition.

In one example according to the invention, the fold latch mechanism further can have a housing mounted to the chassis, a release handle with a paddle on an exterior surface of the housing, and a latch hook within the housing. The latch hook can be biased to the latched condition and the release handle can be movable to pivot the latch hook to the unlatched condition.

In one example according to the invention, the fold latch mechanism further can have a center plate within a housing, and a pair of latch hooks, one pivotally mounted on either side of the center plate.

In one example according to the invention, the stroller chassis further can have a stroller handle extending from the chassis. The stroller handle can be movable between a normal use position and a stowed position relative to front and rear wheel sections of the chassis.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed stroller frame assembly and fold latch mechanism solves or improves upon one or more of the above-noted and/or other problems and disadvantages with prior art stroller frames and fold latches for strollers. In one example, the disclosed stroller frame assembly has a unique foldable chassis and a fold latch mechanism that is configured to accommodate the frame or chassis configuration. There is currently no other known stroller on the market that has a frame geometry similar to the stroller frame assembly disclosed herein. The disclosed frame assembly is considered unique in that it does not include the usual left and right parallel frame sides with separate and discrete pivot joints and latches on each side. The disclosed stroller frame assembly employs unified front leg and rear leg structures that are connected to one another at a single pivot point or chassis joint located above and centrally between the front and rear wheels and beneath the stroller seat. The disclosed fold latch mechanism is located under the seat and, thus, the seat occupant. This eliminates the need to employ two separate fold latches, one on each of left and right frame sides. The disclosed fold latch mechanism includes both latching capability and latch release capability right at the frame joint.

The disclosed fold latch mechanism provides or meets a number of basic attributes or objectives. One, the fold latch mechanism, and thus the release function, is configured to be centrally located near and above the main central pivot point of the front and rear leg structures of the chassis for convenient access by the operator. Two, the components of the fold latch mechanism are positioned and configured to be entirely unobtrusive during normal stroller usage and so as to not be easily and inadvertently disengaged during normal stroller usage. Three, the disclosed fold latch mechanism is configured to comply with current safety standards, which require an operator to apply two separate motions or operations to release or activate the fold latch. Four, the configuration of the frame assembly, including the central pivot joint, creates a shorter length folded frame configuration and places the latch mechanism in the middle of the frame assembly. A user can carry the frame assembly from the middle of the frame more easily than prior art stroller examples.

In one example, the disclosed stroller frame assembly has a fold latch mechanism positioned between the frame sides and beneath the location of a stroller seat. In one example, the fold latch mechanism has a latch release handle and latches or retains the frame assembly in the in-use configuration. In one example, the latch release handle can be moved to a release position to unlatch or disengage the fold latch mechanism in order to permit the stroller frame assembly to be folded or reconfigured to the folded configuration. In one example, the chassis has a front wheel section and a rear wheel section that pivot relative to one another along a pivot axis or fold joint oriented transversely between the frame sides. The fold latch mechanism is positioned centrally between the frame sides on the pivot axis. The fold latch mechanism is not positioned on the handlebar or the handle grips of the stroller and is not positioned or exposed on either side of the stroller frame assembly. The disclosed fold latch mechanism is thus less likely to be inadvertently actuated during normal use of the stroller.

Figure 1:
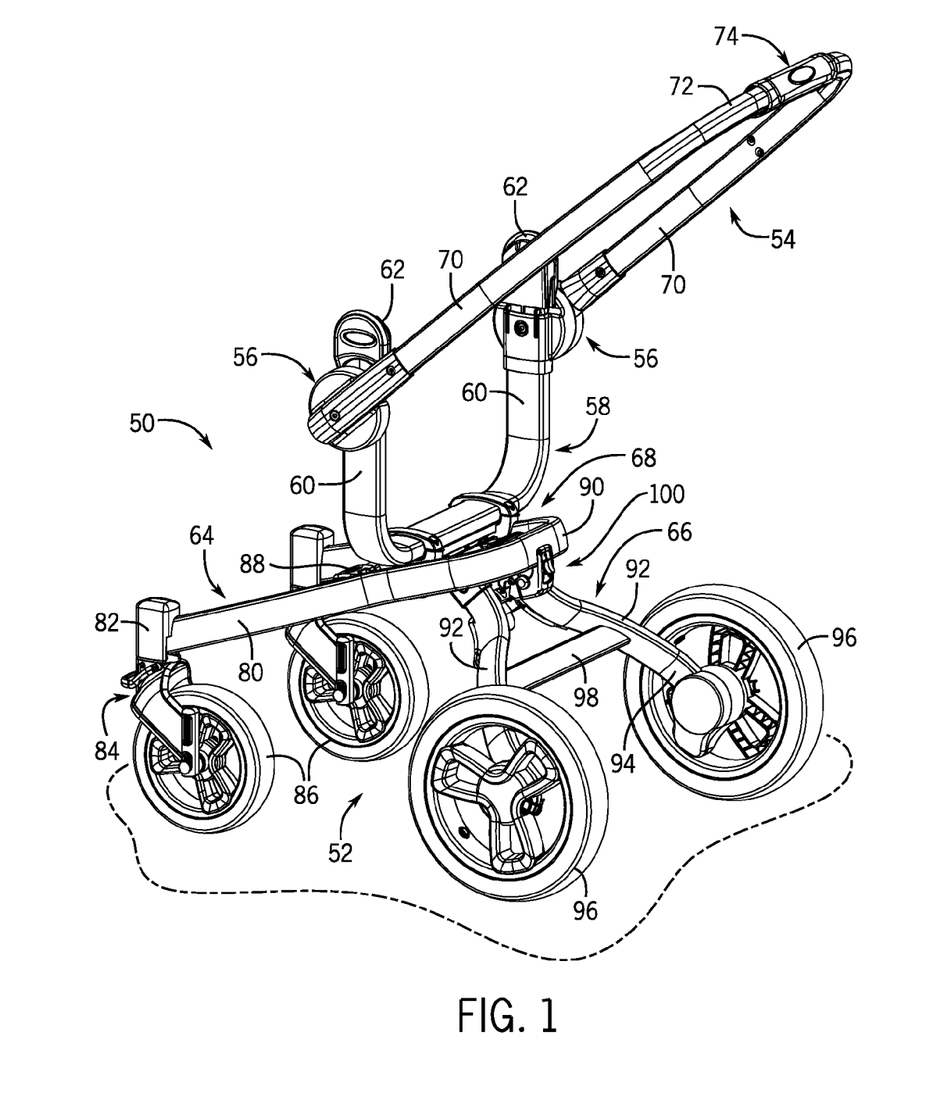
FIG. 1 shows a rear, left side perspective view of one example of a stroller frame assembly constructed in accordance with the teachings of the present invention and in a set up configuration.

Turning now to the drawings, FIG. 1 shows one example of a stroller frame assembly 50 constructed in accordance with the teachings of the present invention. In this example, the frame assembly 50 generally has a left and a right side and a front end and a rear end. The frame assembly 50 has a chassis 52 and a handle 54 pivotally coupled to the chassis at a pair of spaced apart handle pivot joints 56. The disclosed chassis 52 has a U-shaped seat mount 58 with a pair of spaced apart, upstanding, left and right seat mounting posts 60 that terminate at exposed upper ends 62. The chassis 52 in this example also includes a front wheel section 64 and a rear wheel section 66 that are coupled to one another at a central chassis joint 68 that extends transversely between the left and right frame sides. The seat mount 58 is carried on and projects upward from the central chassis joint 68 in this example.

A stroller seat assembly would ordinarily be mounted to the upper ends 62 of the mounting posts 60 in this example. However, the stroller seat is not shown herein so as to more easily show other components and aspects of the frame assembly 50. In general, the stroller seat would have opposed sides that would mount to the upper ends 62 of the mounting posts 60. Thus, the seat assembly would be positioned between the mounting posts 60 above the chassis joint 68. In other examples, the frame assembly 50 can be configured so that other optional seating devices can be removably mounted to the seat mount 58, such as an infant seat, an infant car seat or carrier, a support bar for a carrier, and/or a bassinet or carrycot. The seat mount 58 can be configured to removably attach or mount a seat assembly or other such seating device so as to render the stroller frame assembly a part of a modular stroller system or travel system.

The handle 54 in this example is generally an inverted U-shaped structure with a pair of push arms or push bars 70. Upper ends of the push bars 70 are interconnected by a transverse handlebar 72. Each of the push bars 70 also has a lower end pivotally connected to one of the handle pivot joints 56, which are carried on or near the upper ends 62 of the mounting posts 60 in this example. The handle 54 can be of a lightweight tubular metal construction, but is certainly not limited to any type of materials or particular structural configuration. The handle 54 can vary in configuration and construction from the examples shown and described herein. In this example, a handle actuator 74 is positioned on the handlebar 72 and is coupled by cables (not shown) routed from the actuator through the tubular push bars 70 to the handle pivot joints 56. The actuator 74 can be actuated to release the handle 54 from the in-use position shown in FIG. 1 as needed. The cables are connected to the handle pivot joints 56 to release a latch mechanism (also not shown herein) within the pivot joints to allow the handle 54 to pivot forward as described below.

The handle actuator 74 can be a linear pull-type actuator that is gripped and pulled toward the handlebar 72, a rotating-type actuator that is gripped and rotated relative to the handlebar, or the like. Such actuators are known in the art for providing certain functions such as collapsing and/or folding a stroller. Thus, the handle actuator 74 is not described in any detail herein, as one having ordinary skill in the art would understand the function and various configurations and components for such a conventional actuator. In addition, the pivot joint construction and handle latch components and function can vary within the spirit and scope of the present invention. One example of a suitable pivot joint construction is disclosed and described in International PCT application No. PCT/US2009/052614 filed by the assignee of the instant patent on Aug. 3, 2009 and entitled "Storage Latch and Reversible Handle for a Stroller." In the '614 application, the handle pivot joints allow the handle to pivot from the in-use or normal use position to a stowed position. The pivot joints in the '614 application create a storage latch for the stroller, keeping the stroller assembly in the folded or storage configuration until the handle is moved from a stored orientation. The handle in the '614 application is also reversible and thus movable between the normal use position behind the stroller seat and a reverse position located in front of the seat for pushing the stroller in a reverse direction. These optional handle features and functions are also within the spirit and scope of the present invention though not disclosed or described in detail herein.

In the disclosed example, the front wheel section 64 of the chassis 52 is generally U-shaped and includes a pair of spaced apart, left and right side, front legs 80, which terminate at forward or free ends 82. A front wheel assembly 84, including at least one front wheel 86, is mounted to a free end 82 of each of the front legs 80. The front wheel section 64 also includes a cross brace 88 that extends between the front legs 80 and is spaced rearward of the front wheel assemblies 84. The cross brace 88 is configured to add structural integrity and stability to the front wheel section. The rear ends of the front legs 80 continue into an integral crossbar 90 that is positioned rearward of the chassis joint 68 in this example and that interconnects the front legs 80. Also in this example, the front wheel section 64 is fixed relative to the chassis joint 68. However, in other examples, the front wheel section could be pivotally movable relative to the chassis joint, if desired. As will be evident to those having ordinary skill in the art, the configuration and construction of the front wheel section 64 can vary within the spirit and scope of the present invention from the example shown and described herein.

The rear wheel section 66 of the chassis 52 in this example has a pair of spaced apart, left and right side, rear legs 92, which terminate at rearward or free ends 94. A rear wheel 96 is rotatably connected to each of the free ends 94 of the rear legs 92. The rear wheel section 66 also includes a structural cross brace 98 spaced upward from the free ends 94 and extending between the rear legs 92. In this example, each of the rear legs 92 has an upper end that is pivotally connected relative to the front wheel section 64 at the chassis joint 68. Details of the rear leg connection to the chassis joint are described in greater detail below. As will be evident to those having ordinary skill in the art, the configuration and construction of the rear wheel section 66 can also vary within the spirit and scope of the present invention from the example shown and described herein.

Figure 2:
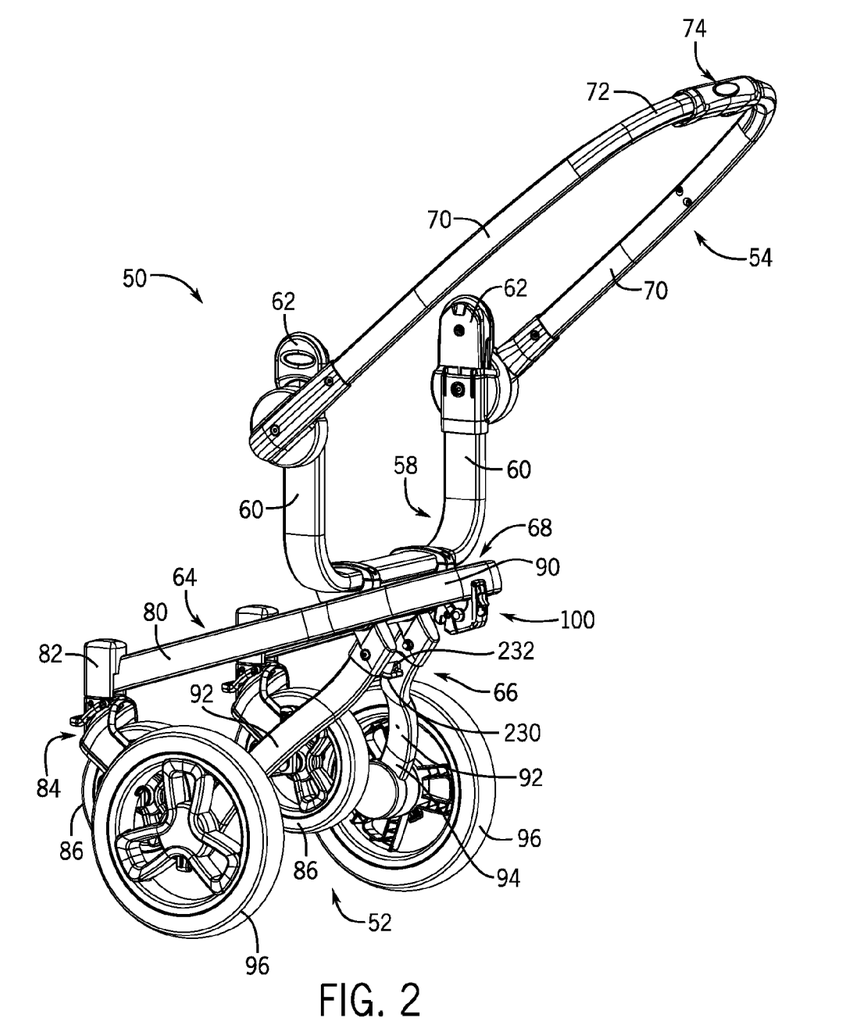
FIG. 2 shows the stroller frame assembly in FIG. 1, but with a chassis portion of the frame assembly in a folded configuration.
Figure 3:
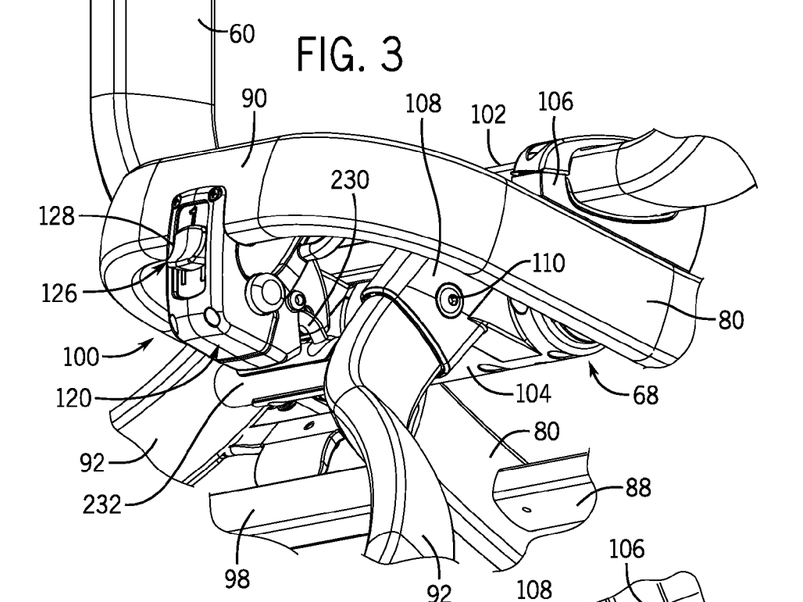
FIG. 3 shows a close-up, rear, right side perspective view of a fold latch mechanism on the stroller frame assembly in FIG. 1.
Figure 4:
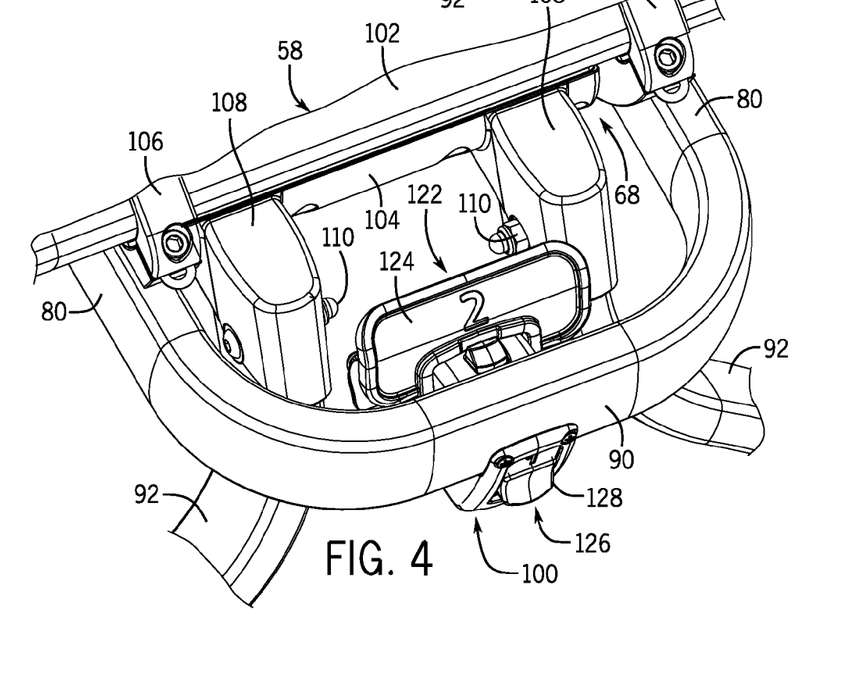
FIG. 4 shows a top perspective view of the fold latch mechanism in FIG. 3.

The disclosed stroller frame assembly 50 is foldable between the in-use or set-up configuration of FIG. 1 and a folded configuration. In this example, the chassis 52 is foldable to a folded configuration about the chassis joint 68 as depicted in FIG. 2. The disclosed stroller frame assembly 50 has a fold latch mechanism 100 as generally depicted in FIGS. 3 and 4. The fold latch mechanism 100 in this example is positioned centrally between the left and right frame sides on the chassis joint 68. The mechanism 100 would be positioned under the stroller seat (not shown) adjacent the chassis joint 68. In this example the seat assembly is removable and can be removed before the frame assembly is folded. The chassis joint 68 in this example is comprised of multiple components.

The U-shaped seat mount 58 has a horizontal cross-member 102 extending between and interconnecting the bottom ends of the two seat mounting posts 60. The central pivot hub 104 is connected to the underside of the cross-member 102 and secured to the cross-member by a pair of brackets 106. The central pivot hub 104 is pivotable about a horizontal axis that extends transversely across the chassis 52 between the left and right sides. The hub 104 is pivotable relative to the brackets 106. As shown in FIGS. 3 and 4, a pair of rear leg mounts 108 projects radially rearward from the central pivot hub 104. Upper ends of the rear legs 92 are seated, one each within one of the mounts 108 and secured therein by fasteners 110. As represented in FIG. 2, the pivot hub 104 and the leg mounts 108 can pivot relative to the brackets 106 about the axis of the chassis joint 68 as the rear leg section 66 is moved between the in-use configuration and the folded configuration.

The brackets 106 and the cross-member 102 are rotationally fixed relative to the front leg section 64 in this example. The rear leg section 66 pivots about the chassis joint axis relative to these components in this example. As will become evident to those having ordinary skill in the art upon reading this disclosure, the various chassis and joint components can be reconfigured in such a way so that, in one alternate example, the front leg section pivots relative to the rear leg section during folding. In another alternate example, both of the front and rear leg sections could pivot during folding.

With reference to FIGS. 3 and 4, the disclosed fold latch mechanism 100 generally has a latch housing 120 carried on the crossbar 90 in this example. The fold latch mechanism 100 has a lever or release handle 122 with a grip portion or paddle 124 movably carried on a top surface of the housing 120. The mechanism also has a safety catch 126 with a slide button or actuator 128 carried on a rear facing surface of the housing. In general, the paddle 124 and the actuator 128 are positioned and oriented such that a user can manipulate both using only one hand when releasing the fold latch mechanism. The fold latch mechanism 100 can be configured in a latched condition shown in FIGS. 3 and 4. In the latched condition, the mechanism in this example holds the chassis 52 in the in-use configuration of FIG. 1. The fold latch mechanism 100 can also be reconfigured to an unlatched condition whereby the chassis 52 can be folded to the folded configuration in FIG. 2.

Figure 5:
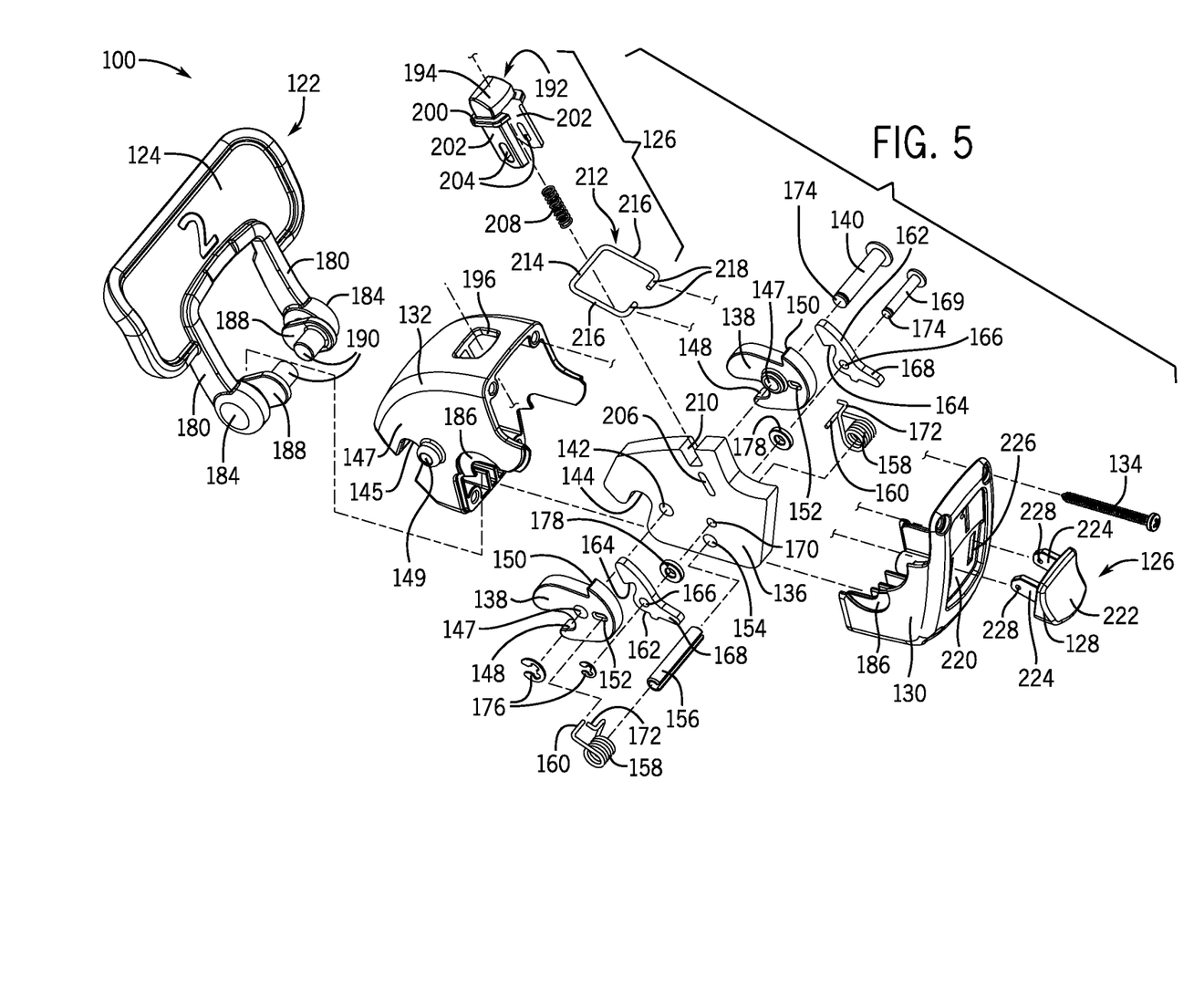
FIG. 5 shows an exploded view of the latch mechanism shown in FIGS. 3-4.

FIG. 5 shows an exploded view of a majority of the fold latch mechanism 100 in the disclosed example. The housing 120 is provided with two parts including a rear section 130 and a front section 132 that can be fastened together utilizing fasteners 134 to enclose the internal guts of the mechanism. The housing 120 can be configured to hide and protect the internal components of the fold latch mechanism and to provide a suitable user interface to unlatch the mechanism. The fold latch mechanism 100 includes a carrier plate or center plate 136 extending lengthwise and bisecting the housing 120. In this example, substantially mirror image components are mounted on either side of the center plate within the housing 120. These components create a first part of the fold latch mechanism 100 and create the safety catch 126. As will be evident to those having ordinary skill in the art, only one set of these latch parts need be provided with the invention still functioning as intended. In this example, the mechanism has a single redundancy, with one complete, independent mechanism located on each side of the carrier or center plate 136. If one side of the mechanism fails, the other side can still function to latch the stroller.

Each side of the center plate 136 includes a latch hook or rotatable catch 138 pivotally mounted to the plate on a common pivot or latch pin 140. The latch pin 140 is received through a pivot opening 142 in the plate that is positioned near and rearward of a notch or latch seat 144. The seat 144 is formed as a recess or notch extending upward and into an edge of the plate 136. Each side 145 of the rear section of the housing has an upward extending cutout 146 in the bottom edge. The cutouts are shaped and positioned to match that of the seat 144. Each latch hook 138 is also formed with a pivot opening 147 through which the pin 140 extends. Each latch hook 138 further has an elongate, open ended slot 148 extending radially outward from the opening 146 and formed in an edge of the hook. Each of the center plate 136 and the latch hooks 138 is formed as a relatively thick, flat, metal plate in this example. The housing has a pair of stop protrusions 149 that extend outward from the sides 145 in this example and assist in positioning the release handle 122. The configuration of these components, and materials from which they are fabricated, can vary within the spirit and scope of the present invention. Forming these components from a metal material will render the components strong and durable and will assist the fold latch mechanism 100 in yielding a sturdy latch when latched.

A tooth 150 is formed in the edge of each of the latch hooks 138 on a side generally opposite the respective slot 148. A spring slot 152 is also formed through each of the latch hooks 138 adjacent but spaced from the pivot opening 146. The center plate 136 includes a spring pin opening 154 and a spring mounting pin 156 received through the opening. An end of the mounting pin 156 protrudes from each side of the center plate 136 and a torsion spring 158 is mounted on each exposed end of the pin. One end of each of the torsion springs has a bent tip 160 received in the spring slot 152 on a respective one of the latch hooks 138. A latch lever, dog, or pawl 162 is also pivotally mounted on either side of the center plate 136. Each of the pawls 162 has a pawl tooth 164 formed at one end. Each pawl 162 also includes a pivot aperture 166 formed therethrough and positioned centrally on the pawl. A finger 168 is formed by the end of the pawl 162 opposite the pawl tooth 164. A pawl pivot pin 169 projects through a pawl aperture 170 in the center plate 136 and through the aperture in each of the pawls 162. The opposite end of each of the torsion springs 158 includes a bent tab 170 that contacts the corresponding pawl finger 168.

As shown in FIG. 5, the latch pin 140 and a pawl pin 169 each has a free end with a groove 174 configured to receive a spring clip or C-clip 176 to retain the pins when installed. In this example, the spring mounting pin 156 is a split pin that is forcibly fit through the spring pin opening 154 to retain the pin in place on the central plate 136. The torsion springs 158 are then loosely retained on the free ends of the pin and captured thereon by the housing when assembled. As will be evident to those having ordinary skill in the art, the configuration and construction of the various pivots and pins for the latch hooks 138, pawls 162, and springs 158 on each side of the central plate can vary from the examples shown and described herein. Other types of fasteners or fastening arrangements can certainly be utilized. Other types of pivot joints can also be utilized. Washers 178 can be appropriately positioned between the center plate 136 and the rotating or pivoting components to reduce or maintain a desired level of rotational friction.

The release handle 122 in this example has a pair of pivot legs 180 extending downward from the paddle or grip portion 124. The pivot legs 180 are spaced apart from one another in order to fit over the outer left and right surfaces 145. The lower end of each of the pivot legs 180 has a hub 184 that seats in a hub depression 186 formed in each side 145 of the housing 120. In this example, a portion of the hub depressions 186 is formed in the side of each of the rear and front sections 130, 132. The hubs 184, and thus the legs 180, can rotate within the hub depressions 186 on the assembled housing. A cam leg or fixed link 188 projects radially rearward from the hub 184 on each of the pivot legs 180. A cam projection 190 protrudes inward from a free end of each of the cam legs 188 toward the opposite leg. The cam projections 190 thus extend toward one another and are axially aligned with, but spaced from one another. The gap between the cam projections 190 is sized to loosely capture the center plate 136 therebetween.

The safety catch 126 in this example has a spring loaded bolt or plunger 192 with a stop projection 194 protruding through an opening 196 in a top of the front section 132 of the housing. The plunger 192 has a stop shoulder 200 between the projection 194 and a pair of spaced apart extensions 202. The stop shoulder limits how far the projection can travel through the opening 196 in the housing. The extensions 202 extend downward from the projection 194 and the shoulder. The central plate 136 is captured between the extensions 202. Each extension has a connector slot 204 near its free end. A travel or guide slot 206 is formed through the central plate 136 and aligns with the connector slots in the extensions. A biasing spring 208 is seated in a spring notch 210 in an upper edge of the central plate 136. The spring notch 210 is in line with the travel or guide slot 206 in the plate 136 and the spring extends from the notch between the extensions 202 into the interior of the projection 194 of the plunger. A C-shaped wire form or yoke 212 has a transverse segment 214 that is captured in the connector slots 204 in the extensions 202. The yoke 212 also has a pair of parallel legs 216 that extend from the transverse segment 214 and terminate at inwardly bent tips 218.

The actuator 128 of the safety catch 126 is seated in a recess 220 on an exposed face of the rear section 130 of the housing 120. The actuator 128 has a contact surface 222 exposed on the exterior of the housing and a pair of prongs 224 spaced apart and projecting from the opposite side of the actuator. The prongs 224 extend through vertically elongate apertures 226 through the housing surface in the recess 220. Each prong has a through-hole 228 near the end of the prong. The bent tips 218 of the yoke 212 are connected to the prongs through the holes 228. The apertures 226 are longer than a height of the prongs 224 such that the actuator can slide vertically along the surface of the housing within the recess 220 when actuated. Movement of the actuator 128 results in movement of the plunger 206 because the actuator will pull on the yoke 212 which in turn will pull on the plunger. The guide slot 206 permits movement of the yoke 212 and directs movement along the lengthwise axis of the plunger 192.

Figure 6A:
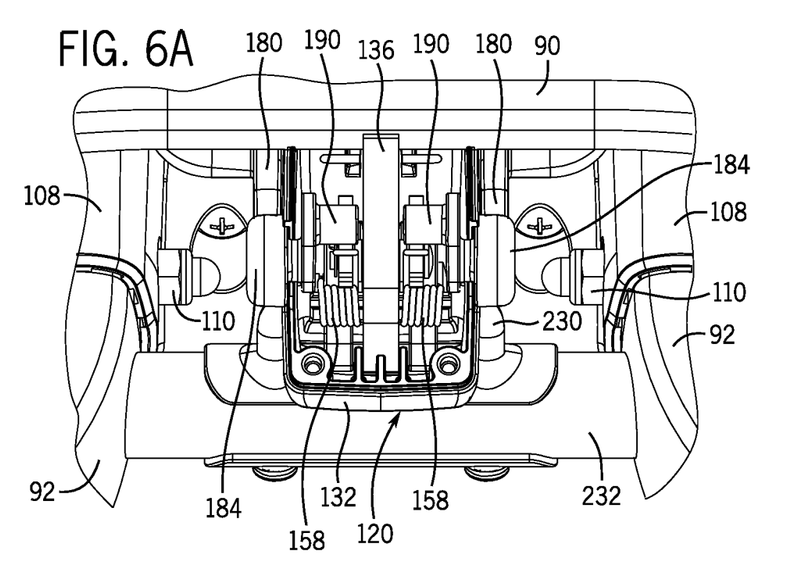
FIG. 6A shows a rear cut away view of the fold latch mechanism in FIGS. 3 and 4.
Figure 6B:
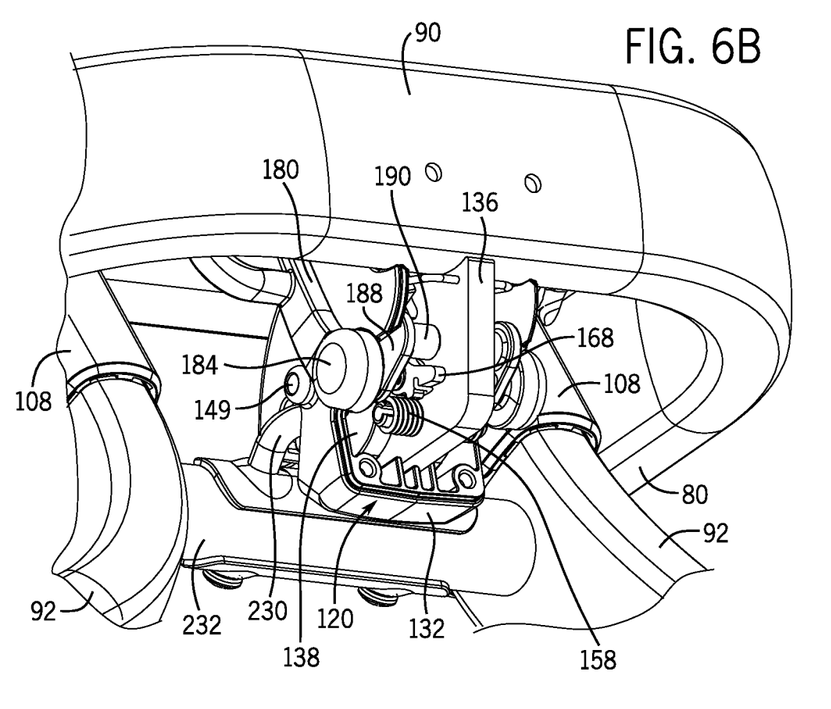
FIG. 6B shows a rear, bottom perspective view of the latch mechanism in FIG. 6A.

Another part of the latching mechanism 100 in this example is a latch hoop or bar 230 that is carried on the rear leg section, and in this case an upper cross link 232 of the rear leg section 66 as shown in FIGS. 3, 6A, and 6B. Thus, the latch bar 230 is positioned between the upper ends of the rear legs 92. A transverse part of the latch bar 230 is spaced from the cross link 232, but the latch bar is fixedly mounted to the cross link. As shown in FIG. 6B, latch bar 230 is generally U-shaped in this example. The latch bar 230 can be a heavy gauge steel structure bent to the U-shape so as to impart strength and durability to the latch mechanism and latching function.

Figure 7:
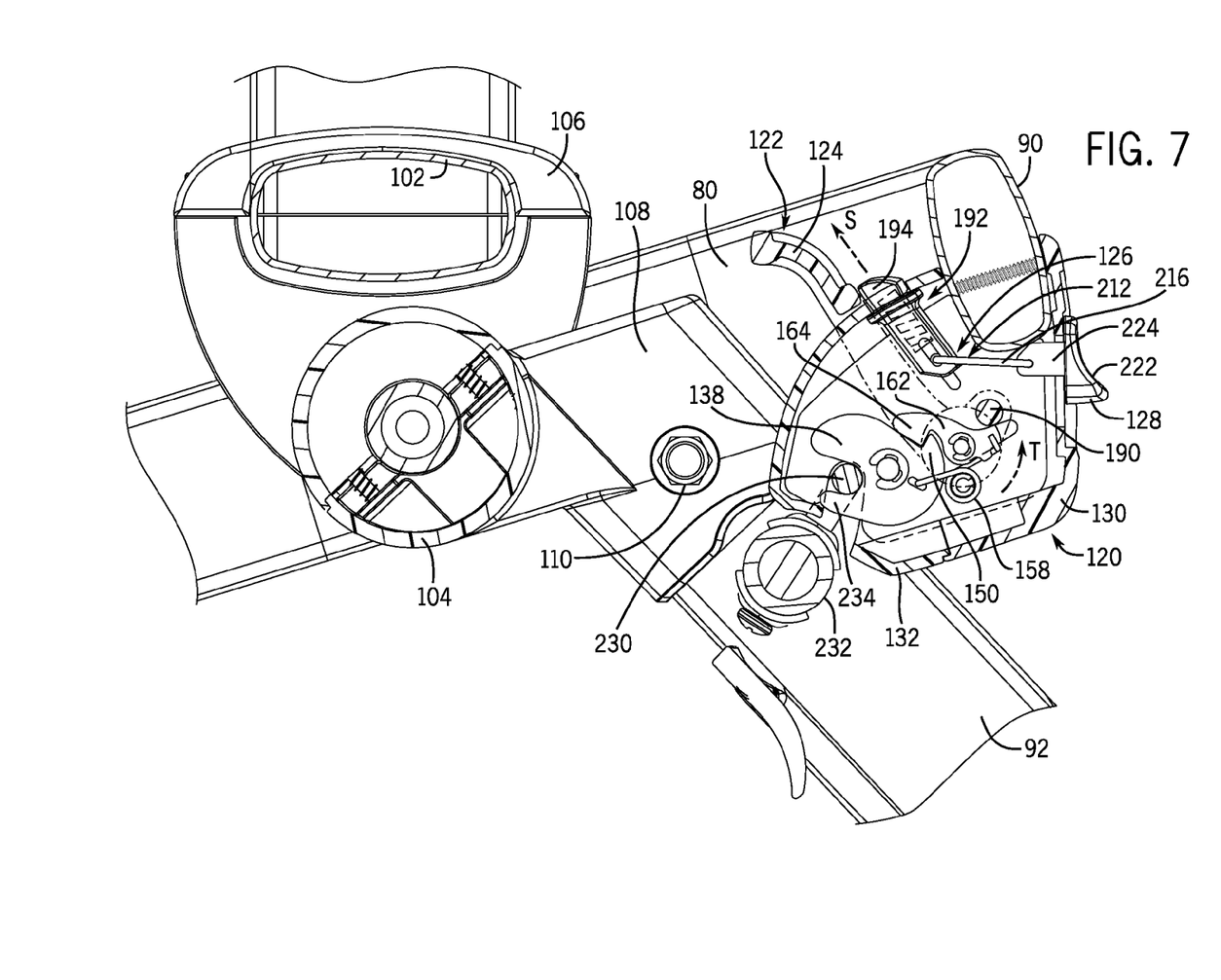
FIG. 7 shows a cross-section taken along line VII-VII in FIG. 6A of the fold latch in a locked and latched condition and the frame assembly in the set up configuration.

FIGS. 6A and 6B show the assembled fold latch mechanism 100 in a latched condition and with the rear housing section 130 removed. The bent tabs 172 of each torsion spring 158 bear against an underside of a respective one of the pawl fingers 168. This biases the fingers 168 upward and, thus, the pawl teeth 164 downward onto the latch hooks 138. The cam projections 190 are positioned above the pawl fingers 168 in the latched condition. FIG. 7 shows a cross-section depicting one side of the fold latch mechanism 100 and illustrates the orientation of the various components in the latched condition. Both sides of the mechanism will be essentially the same. In this condition, the release handle 122 is in a latched position and the plunger 192 and the projection 194 are biased upward to a locked condition in the direction of the arrow S by the spring 208. In this arrangement, the release handle 122 is blocked from moving rearward to an unlatched or released position by the projection 194. The handle 122 is also borne against the stop protrusions 149 (see FIGS. 5 and 6B) in the opposite direction to limit forward travel of the release handle away from the projection 194. The latch bar 230 is seated upward into the seat 144 of the carrier plate 136 and the cutouts 146 in the housing sides 145. The bar 230 is captured therein by latch fingers 234 that form one side of the slot 248 on the latch hooks 138. In this arrangement, the slots 148 in the latch hooks 138 are misaligned with the notch or seat 144 and the latch fingers 234 prevents downward movement of the catch bar 230. The upward rotated position of the slot end of the latch hooks 138 moves the spring slots 152 downward. This causes the bent tips 172 on the torsion springs to bias upward in the direction of the arrow T against the pawl fingers 168. The pawl teeth 164 on the pawls 162 are thus biased downward and engage the teeth 150 on the latch hooks 138. The engaged teeth retain the latch hooks 138, and thus the latch mechanism 100, in the latched condition.

Figure 8:
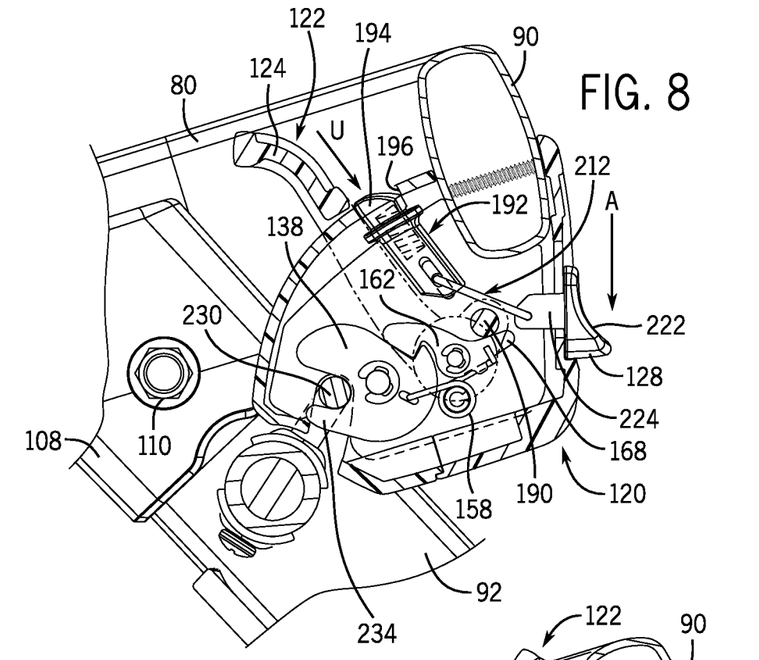
FIG. 8 shows the latch mechanism in FIG. 7 in an unlocked but latched condition.
Figure 9:
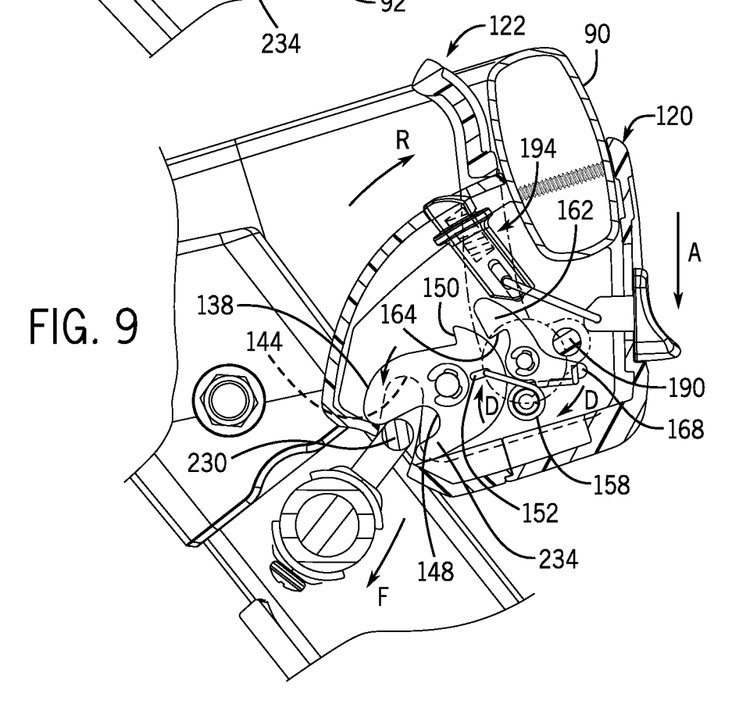
FIG. 9 shows the latch mechanism in FIG. 8 but in an unlatched condition.
Figure 10:
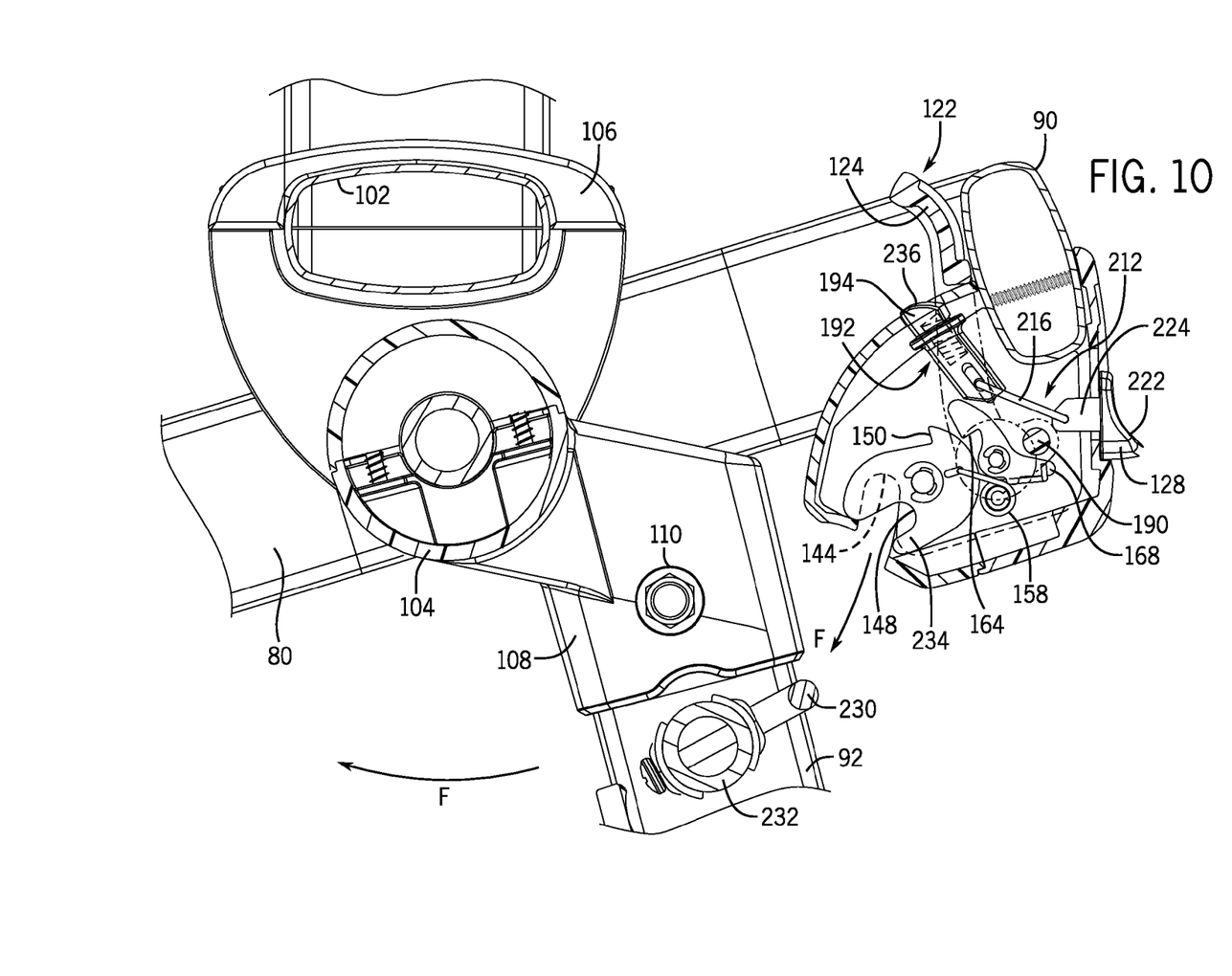
FIG. 10 shows the latch mechanism in FIG. 9 but with the chassis portion of the frame assembly in a partly folded configuration.

FIGS. 8-10 show the procedure for reconfiguring the fold latch mechanism 102 to an unlatched or released condition. First, as shown in FIG. 8, a user can push down on the contact surface 222 of the actuator 128 on the safety catch 126 in the direction of the arrow A. This moves the safety catch 126 from the locked condition to an unlocked condition. Moving the actuator 128 downward pulls the plunger 192 and projection 194 downward in the direction of the arrow U into the housing 120 against the bias of the spring 208. The plunger and the projection retract into the opening 196 in the housing, clearing a path for the release handle 122 to move. As shown in FIG. 9, the grip portion or paddle 124 of the release handle can be pulled rearward along the top surface of the housing 120 in the direction of the arrow R toward the crossbar 90 and passed the retracted projection 194. Moving the release handle 122 in this direction pushes the cam projections 190 downward onto the pawl fingers 168. This rotates the pawls 162 against the bias of the torsion springs 158, which in turn disengages the pawl tooth 164 from the tooth 150 on the latch hooks 138. The torsion springs 158 will bias the latch hooks 138 to the disengaged position or a released or unlatched orientation in the direction of the arrows D. This moves the latch finger 234 out of the way of the latch bar 230 and out of alignment with the seat 144. The latch hooks 138 will also bias the latch bar 230 downward out of the seat by force of the torsion springs 158. This frees the rear leg section 66 to rotate away from the in-use configuration as depicted in FIG. 10 in the direction of the arrow F.

The top of the projection 194 has a ramped surface 236 in this example. Even with the release handle 122 in the unlatched position, the user can release the actuator 128, which, in one example, can allow the safety catch 126 to return to the locked condition of FIG. 7. A user does not need to continue to hold the safety catch 126. The ramped top surface 236 can alternatively bear against a bottom surface on the grip portion or paddle 124 of the release handle 122, which can retain the safety catch 126 in the unlocked condition of FIG. 10. In this example, the torsion springs 158 are configured to continue to bias the latch hooks 138 toward the unlatched position or orientation in FIG. 10. The teeth 164 of the pawls 162 bear on the top edge of the latch hooks 138 spaced from the teeth 150. The tooth ends of the pawls 162 are thus prevented from rotating down, which in turn keeps the fingers 168 in a downward position as shown. The release handle is not spring biased to either position and, thus, the handle will remain in the unlatched position.

Figure 11:
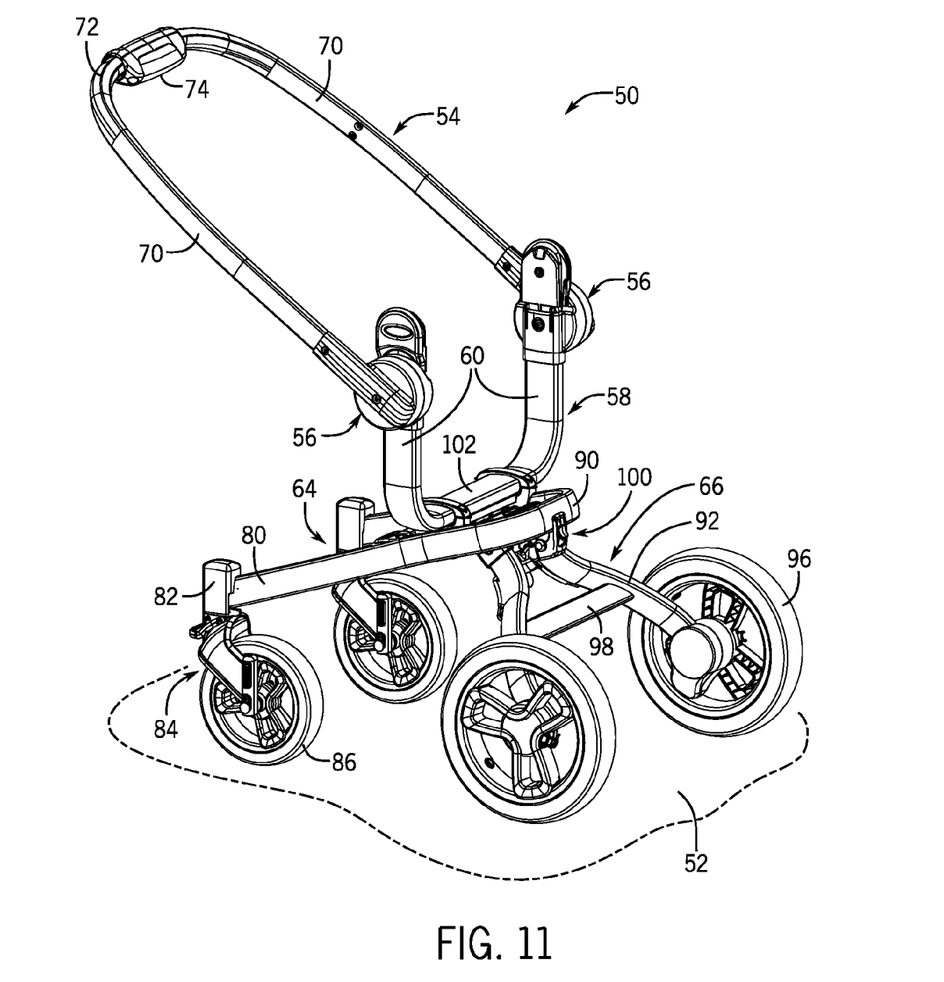
FIG. 11 shows the stroller frame assembly in FIG. 1, but with a handle portion in a partly folded orientation or a reverse handle orientation.
Figure 12:
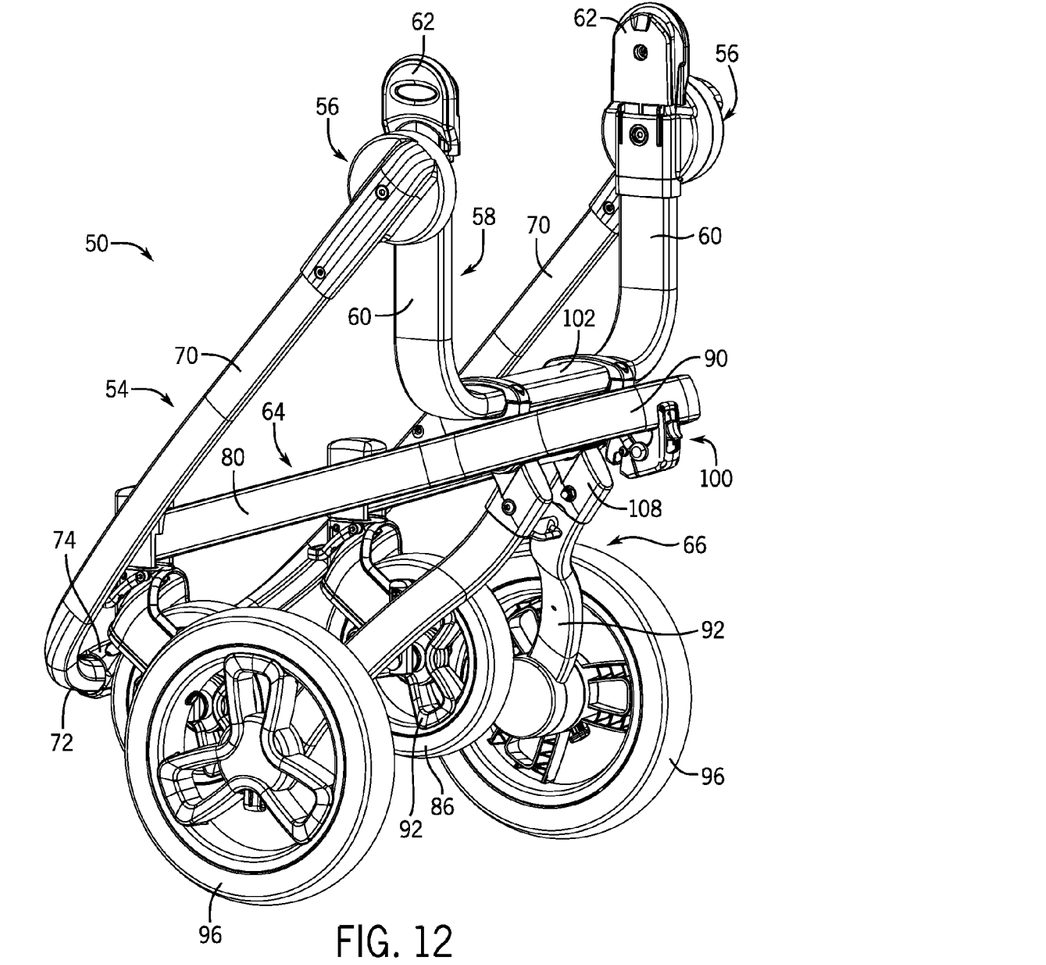
FIG. 12 shows the stroller frame assembly in FIGS. 1, 2, and 11 in a completely folded configuration.

With the fold latch mechanism 100 in the unlatched condition, a user is free to rotate the rear leg section 66 toward the front leg section 64 to the folded configuration of FIG. 2 in the direction of the arrows F in FIG. 10. To completely fold the stroller frame assembly 50 in this example, a user can actuate the actuator 74, rotate the handle 54 forward, as shown in FIG. 11, and then downward to a stowed position. FIG. 12 illustrates the stroller frame assembly 50 in a completely folded configuration in accordance with the teachings of the present invention. Further downward movement of the handle 54 is prevented by the structure of the frame assembly 50, and particularly the front wheel section 64, which thus defines the lower most stowed position of the handle in this example. The handle 54 and pivot joints 56 can also be constructed so that the actuator 74 must be actuated in order to release the handle from the stowed position of FIG. 12, if desired, prior to unfolding the handle and moving it back to the normal use position of FIG. 1.

A user can unfold the folded stroller frame assembly 50 in FIG. 12 by rotating the handle 54 upward toward the position in FIG. 11 and rearward toward the normal use position of FIG. 1. A user can also rotate the rear leg section 66 away from the front leg section 64 toward the in-use configuration of FIG. 1. In doing so, the latch part 230 will move upward toward the slots 148 in the latch hooks 138. The slots 148 are exposed in the opening created by the seat 144 and the cutouts 146 in the housing sides 145. As the latch bar 230 contacts the latch hooks 138, the latch bar will push the slots 148 of the latch hooks upward, which will rotate the latch hooks against the bias of the torsion springs 158. This will increase the spring force borne against the pawl fingers 168. The pawl teeth 164 in the pawls 162 will fire into engagement with the teeth 150 on the latch hooks when the hooks rotate to a home position or latched orientation aligning the teeth. The pawls 162 will then retain the latch hooks 138 in the latched condition. As the latch hooks rotate, the latch fingers 234 on the latch hooks 138 will rotate upward and securely capture the latch bar 230 in the seat 144. As the components rotate, the pawl fingers 168 will push upward on the cam projections 190 of the release handle 122. This will force the release handle 122 toward the latched position of FIG. 7. If the plunger 192 and projection 194 are in the locked position, the paddle 124 can ride along the top ramp surface 236 to reach the latched position in this example. If the projection 194 was instead borne against a bottom surface of the paddle 124 and held in the unlocked condition, the plunger 192 can fire to the locked condition after the release handle 122 reaches the home or latched position of FIG. 7 and clears the projection 194.

In the disclosed example, the stroller chassis 52 can be folded first and then the handle 54 can be repositioned to the stowed position or vice versa. If a storage latch mechanism is employed in the handle pivot joints, as mentioned above, the handle may need to be rotated toward the normal use before the chassis is unfolded. In this example, the chassis can be unfolded first and then the handle can be repositioned, or vice versa. In the disclosed example, the handle and the chassis each fold and unfold manually. In an alternate example, the chassis can be configured to fold or unfold automatically upon actuation of the fold latch mechanism and/or the handle 54. In a further example, the stroller seat assembly (not shown) could be constructed so as to fold with the frame assembly instead of having to be removed for folding. The release handle could be relocated so as to be accessible under, but behind the seat with the seat in place on the frame assembly.

The release handle, housing and cover, safety catch, and various components of the disclosed fold latch mechanism can vary in configuration and construction from the examples shown herein. A single fold latch hook system can be utilized instead of the redundant two hook or catch system disclosed herein. The parts can be fabricated from a variety of different materials as well. In one example, the release handle, housing and cover, and safety catch button can be made from a plastic with a high toughness or strength, such as Nylon. The paddle of the release handle can be over-molded with soft TPE for better grip and comfort. The plunger and yoke can also vary from the examples shown and the materials used to fabricate these components can also vary. The projection on the plunger could be made from an engineered plastic such as Acetal with good lubricity to reduce friction. The fold latch mechanism and components can be relocated to another position on the stroller frame different from that shown and described herein. The front leg section 64 can be configured to rotate and the rear wheel section 66 can be fixed, or both can be configured to rotate during folding. The center axle can be fixed to the rear wheel structure instead of the front wheels structure as well. The fold latch mechanism can be located differently, such as on the rear wheel section and the latch bar can be on the front wheel section to accommodate such alternate structures.

In one example, the center plate can be molded plastic or stamped from aluminum and could be welded to the front leg section. The pawls and catches or latch hooks could be diecast from a metal such as aluminum or zinc for durability. The pawls could alternatively be stamped from steel for durability and improved wear characteristics against the softer metal catches or hooks. The various pins could be made from stainless steel to prevent corrosion. The housing could be a molded plastic, a durable plastic such as Nylon, or can alternatively be made from a metal or aluminum material. The shape of the components shown and described herein can also vary from the examples shown.

As a safety precaution, the safety catch 126 retains the release handle 122 in the released or home position. The configuration and construction of the safety catch and its various components can vary from the embodiment shown and described herein and yet function as intended. The connection between the plunger and actuator can be altered from the yoke 212 described herein. The shape, configuration, and location of the plunger, actuator and connector/yoke can be altered from the examples described.

The various compression and torsion springs disclosed herein for all of the mechanisms can be wound from spring-tempered steel or from other suitable hardened steel. The storage and fold latch pins can alternatively be made from a non-stainless steel or aluminum for high-strength. The various joints, mechanisms, and components can be installed and fastened in place using rivets and/or screws or other types of removable or permanent fasteners as desired. The materials used to fabricate the various frame and latch mechanism components can vary and the invention is not intended to be limited to any specific materials.

Although certain stroller frame assembly latches and components have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A foldable stroller frame assembly having left and right sides, a front end, and a rear end, the frame assembly comprising:
   a chassis joint between the left and right sides;
   a front wheel section extending toward the front end;
   a rear wheel section extending toward the rear end and coupled to the front wheel section at the chassis joint, the front and rear wheel sections being pivotable away from one another to an in-use configuration and toward one another to a folded configuration;
   a fold latch mechanism having a housing and reconfigurable between a latched condition securing the frame assembly in the in-use configuration and an unlatched configuration;
   a release handle on one part of the housing movable to reconfigure the fold latch mechanism between the latched and unlatched conditions; and
   a safety catch with an actuator on another part of the housing, the safety catch retaining the release handle in the latched condition, whereby the actuator is actuated to move the safety catch to unlock the release handle in order to allow the release handle to move,
   wherein the safety catch automatically locks the release handle when the fold latch mechanism is repositioned to the latched condition, and
   wherein the fold latch mechanism is positioned on the frame assembly between the left and right sides adjacent the chassis joint.

2. A frame assembly according to claim 1, wherein the chassis joint defines a fold axis traversing laterally between the left and right sides and wherein the front and rear wheel sections pivot relative to one another about the fold axis.

3. A frame assembly according to claim 1, wherein the release handle is mounted to the fold latch mechanism and has a grip portion that is movable over a surface of the fold latch mechanism to reposition the release handle between a latched position and a release position.

4. A frame assembly according to claim 1, wherein the safety catch is mounted to the fold latch mechanism and the actuator is movable over a surface of the fold latch mechanism to reposition the safety catch between a locked condition and an unlocked condition.

5. A frame assembly according to claim 1, wherein the release handle and the safety catch are both positioned on a part of the fold latch mechanism.

6. A frame assembly according to claim 1, wherein the fold latch mechanism further comprises:
   a latch bar carried by and spaced from one of the front and rear wheel sections between the left and right sides; and
   a latch hook carried on the other of the front and rear wheel sections, the latch hook being configured to engage the latch bar when the fold latch mechanism is latched and the release handle being actuable to disengage the latch hook.

7. A frame assembly according to claim 3, wherein the safety catch is biased to a locked condition holding the release handle in the latched position and can be moved to an unlocked condition freeing the release handle to move to the release position.

8. A frame assembly according to claim 4, wherein the release handle is mounted to the fold latch mechanism and has a grip portion that, when the safety catch is in the unlocked condition, is movable over a surface of the fold latch mechanism to reposition the release handle between a latched position and a release position.

9. A frame assembly according to claim 8, wherein the actuator and the grip portion are spaced relative to one another on the fold latch mechanism permitting actuation of both by one hand of a user.

10. A foldable stroller chassis having left and right sides, a front end, and a rear end, the chassis comprising:
    a chassis joint between the left and right sides;
    a front wheel section extending toward the front end;
    a rear wheel section extending toward the rear end and coupled to the front wheel section at the chassis joint, the front and rear wheel sections being pivotable away from one another to an in-use configuration and toward one another to a folded configuration;
    a fold latch mechanism positioned adjacent the chassis joint between the left and right sides and reconfigurable between a latched condition securing the chassis in the in-use configuration and an unlatched condition;
    a release handle with a grip portion movable on a surface of the fold latch mechanism;
    a projection protruding from a surface of the fold latch mechanism; and
    a safety catch with an actuator exposed on the fold latch mechanism, the actuator movable to release the safety catch to allow the fold latch mechanism to reconfigure between the latched condition and the unlatched condition,
    wherein the projection blocks movement of the grip portion when the safety catch is in a locked condition and wherein moving the actuator to an unlocked condition retracts the projection into the surface and moves the safety catch to an unlocked condition, thereby allowing the grip portion to move, and wherein a part of the fold latch mechanism is carried on the front wheel section and a part of the fold latch mechanism is carried on the rear wheel section.

11. A stroller chassis according to claim 10, wherein the fold latch mechanism further comprises:
the release handle on the fold latch mechanism being movable to reconfigure the fold latch mechanism between the latched and unlatched conditions, wherein the safety catch is movable to unlock the release handle.

12. A stroller chassis according to claim 10, wherein the fold latch mechanism further comprises:
a housing mounted to a crossbar on the front wheel section;
a releasable latch hook within the housing; and
a latch bar mounted to and spaced from a crossbar of the rear wheel section, the latch hook engaging the latch bar in the latched condition.

13. A stroller chassis according to claim 10, wherein the fold latch mechanism further comprises:
a housing mounted to a part of the chassis; and
the release handle pivotally mounted to an exterior of the housing and the grip portion movable along one surface of the housing.

14. A stroller chassis according to claim 10, wherein the fold latch mechanism further comprises:
a housing mounted to the chassis;
the release handle with the grip portion on an exterior surface of the housing; and
a latch hook within the housing, the latch hook biased to the latched condition and the release handle movable to pivot the latch hook to the unlatched condition.

15. A stroller chassis according to claim 10, wherein the fold latch mechanism further comprises:
a center plate within a housing; and
a pair of the latch hooks, one pivotally mounted on either side of the center plate.

16. A stroller chassis according to claim 10, further comprising:
a stroller handle extending from the chassis, the stroller handle being movable between a normal use position and a stowed position relative to the front and rear wheel sections.

17. A stroller chassis according to claim 12, wherein the fold latch mechanism further comprises:
a center plate within the housing; and
a pair of the latch hooks pivotally mounted to the center plate, one on each side of the center plate.

18. A foldable stroller chassis having left and right sides, a front end, and a rear end, the chassis comprising:
a chassis joint between the left and right sides;
a front wheel section extending toward the front end;
a rear wheel section extending toward the rear end and coupled to the front wheel section at the chassis joint, the front and rear wheel sections being pivotable away from one another to an in-use configuration and toward one another to a folded configuration;
a fold latch mechanism positioned adjacent the chassis joint between the left and right sides and reconfigurable between a latched condition securing the chassis in the in-use configuration and an unlatched condition;
a housing mounted to a part of the chassis;
a release handle pivotally mounted to an exterior of the housing and having a paddle movable along one surface of the housing; and
a safety catch with an actuator on another surface of the housing and a projection protruding through the one surface, the projection blocking movement of the paddle in a locked condition,
wherein a part of the fold latch mechanism is carried on the front wheel section and a part of the fold latch mechanism is carried on the rear wheel section.

19. A stroller chassis according to claim 18, wherein the actuator when actuated moves the projection from the locked condition to an unlocked condition permitting movement of the paddle to reconfigure the fold latch mechanism to the unlatched condition.

* * * * *